F. REED.
TIRE.
APPLICATION FILED DEC. 21, 1909.
982,634.
Patented Jan. 24, 1911.
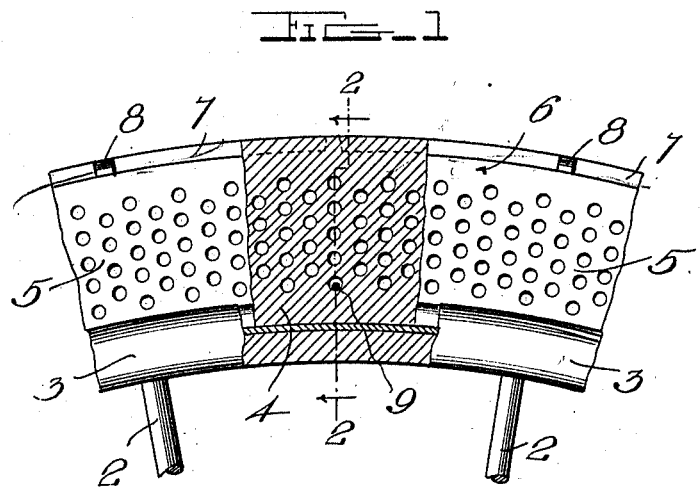
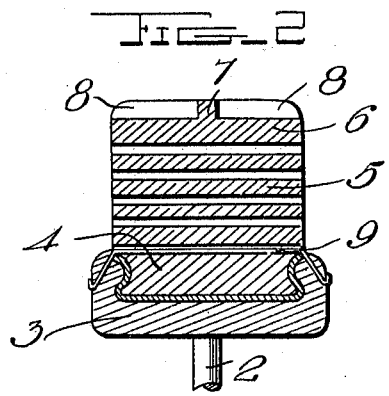
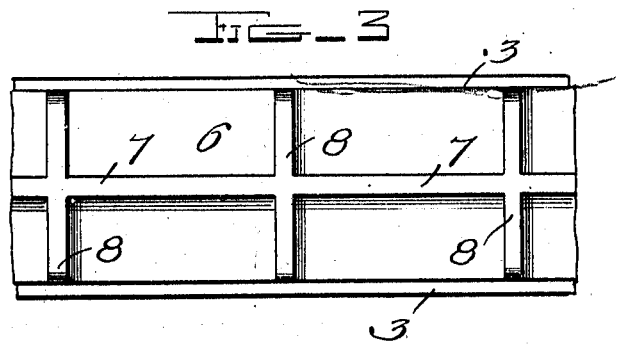
Witnesses
Inventor
Frank Reed
by H. B. Willson & Co.
Attorneys

UNITED STATES PATENT OFFICE.

FRANK REED, OF OMAHA, NEBRASKA.

TIRE.

982,634.

Specification of Letters Patent. Patented Jan. 24, 1911.

Application filed December 21, 1909. Serial No. 534,274.

*To all whom it may concern:*

Be it known that I, FRANK REED, a citizen of the United States, residing at Omaha, in the county of Douglas and State of Nebraska, have invented certain new and useful Improvements in Tires; and I do declare the following to be a full, clear, and exact description of the invention, such as will enable others skilled in the art to which it appertains to make and use the same.

This invention relates to automobile tires.

The primary object of the present invention is to provide an automobile tire which will be absolutely puncture proof and still possess the maximum resiliency whereby break-downs on the road due to punctured tires will be obviated and the easy riding of the occupant or occupants of the vehicle at the same time insured.

With the foregoing and other objects in view, the invention consists of certain novel features of construction, combination and arrangement of parts, as will be more fully described and particularly pointed out in the appended claim.

In the accompanying drawings, Figure 1 is a side elevation of a tire embodying the present improvements. Fig. 2 is a vertical transverse section thereof, and, Fig. 3 is a fragmentary plan view of a portion of the tire.

Referring to the drawings which are for illustrating purposes only and are therefore not drawn to any particular scale, the numeral 1 indicates the hub of a wheel of any ordinary or approved construction to which the tire is applied, 2 the spokes of the wheel and 3 the rim. The tire comprises a solid inner or rim-engaging portion 4, an intermediate transversely perforated resilient portion 5 and an outer tread portion 6. The intermediate portion 5 is perforated transversely its entire circumference to provide the requisite yielding or resiliency of the tire, while the outer or tread portion 6 is preferably made absolutely solid. The tread portion 6 is provided with a central outstanding annular bead or rib 7 which extends entirely around the outer surface thereof and with transverse webs or ribs 8 which extend from opposite sides of the bead 7 to opposite sides of the tire, said webs or ribs 8 coöperating with the annular bead 7 to form anti-skidding means for the tire and to provide for a firm engagement of the tire with the ground or other surface over which it passes.

It is to be understood that I am not limited to the arrangement of the perforations extending through the intermediate portion of the tire, as shown in the drawing, but said perforations may be of any size or sizes or disposed in any desired relation as may be found most expedient in the manufacture of the tire.

To more securely hold the tire in the rim 3 of the wheel, fastening wires 9 are passed through certain of the innermost perforations of the intermediate or resilient portion 5 of the tire and the flanges 9 of the rim, said wires being suitably inclined adjacent their ends and formed with upwardly bent locking ends to provide for the effective retention in place thereof.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

What is claimed as new is:—

In a device of the character described, a tire having a solid rim and tread portions and a resilient intermediate portion having spaced transverse openings therein, and a plurality of fastening wires extending through some of said openings to secure the tire to a wheel rim, said fastening wires having downwardly inclined end-portions adapted to extend through the wheel rim and upwardly-bent locking ends engaging the outer face of said rim.

In testimony whereof I have hereunto set my hand in presence of two subscribing witnesses.

FRANK REED.

Witnesses:
SAMUEL H. FARNSWORTH,
MARION P. McLUNG.